(No Model.)
A. W. KING.
PNEUMATIC GRIP OR HANDLE.
No. 599,131. Patented Feb. 15, 1898.
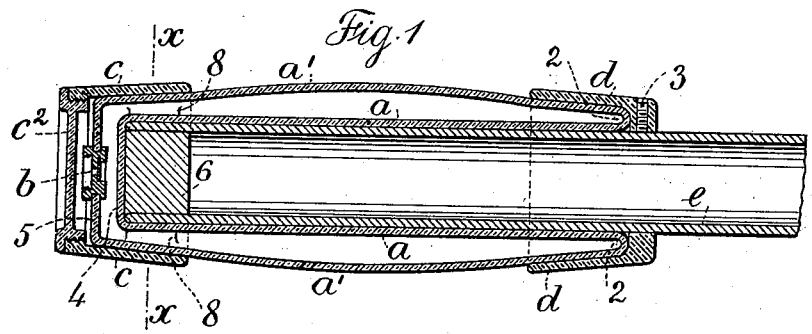
Fig. 1
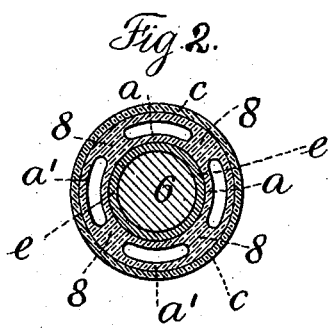
Fig. 2
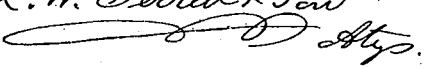
Witnesses:
J. Staib
Chas. H. Smith
Inventor:
Adelmour W. King
per L. W. Serrell & Son
Attys.

UNITED STATES PATENT OFFICE.

ADELMOUR W. KING, OF BROOKLYN, NEW YORK.

PNEUMATIC GRIP OR HANDLE.

SPECIFICATION forming part of Letters Patent No. 599,131, dated February 15, 1898.

Application filed October 3, 1896. Serial No. 607,757. (No model.)

*To all whom it may concern:*

Be it known that I, ADELMOUR W. KING, a citizen of the United States, residing at Brooklyn, in the county of Kings and State of New York, have invented a new and useful Improvement in Pneumatic Grips or Handles, of which the following is a specification.

My invention relates to grips or handles for bicycles. These handles as usually constructed have been made of cork, leather, hard rubber, composition, or two more of said materials, and the same were not yielding to such an extent as to relieve the hand of the vibration of the machine in riding.

The object of my present invention is to supply a grip or handle that yields to the hand and lessens vibration.

In carrying out my invention I employ a double inflatable rubber grip or handle composed of concentric tubular interior and exterior rubber portions permanently united together at their ends. A valve conveniently located is employed to allow air to be forced between the concentric tubular portions for inflating the grip or handle. The double inflatable grip or handle surrounds the ends of the bicycle handle-bar or other foundation or base, and I employ ferrules at the respective ends of the grip or handle to protect the ends and impart a finish and to serve as a receptacle for the valve.

In the drawings, Figure 1 is a longitudinal section showing my invention as adapted to a bicycle handle-bar, and Fig. 2 is a cross-section at the line $x\ x$ of Fig. 1.

$a\ a'$ represent the concentric tubular interior and exterior portions of the double inflatable grip or handle, the one part $a$ being within the other part, $a'$, and the permanent connections being at the respective ends. These tubular portions are preferably made of soft rubber or soft rubber molded on a fabric base, as this construction will wear better and possesses greater strength. The outer portion $a'$ is provided with a valve $b$ of any compact and desirable construction to allow air to be forced in between the parts $a\ a'$ for inflating the grip or handle.

The double inflatable grip or handle is shown as applied upon the end of a bicycle handle-bar $e$. In this instance the inner and outer tubular rubber portions are connected at 2 at one end, while the other ends of said portions are made with heads 4 5, the head 4 of the inner tube coming against the end of the handle-bar, if the same is of wood, or against the surface of a plug 6, inserted in the metal bar $e$, to provide a bearing for the soft rubber. The head 5 is adjacent to and outside of the head 4 and is provided with a valve $b$ to allow the handle to be inflated by air introduced between the tubular portions.

The connecting-webs 8 are shown as at the outer end of the handle, although they may be employed at the inner end, the outer end being the more essential. The valve $b$ is secured in the head 5 at the end of the outer tubular portion $a'$. The respective ends of the double inflatable handle are protected and covered with ferrules $c\ d$, preferably of hard rubber, celluloid, or other similar material placed over said tubular portions before the grip or handle is inflated.

The ferrule $d$ is secured to the handle by a set-screw 3, and the ferrule $c$ is provided with a removable disk $c^2$ to cover the valve and impart a finish to the handle.

My improved grip or handle can be inflated more or less at the pleasure of the user, and the same yields or conforms more or less to the hand as the hand grasps the handle, and the same reduces to a minimum the vibration of the machine that would otherwise be communicated to the hand.

I claim as my invention—

The combination with a rigid supporting core or bar, of a pneumatic rubber grip or handle formed of inner and outer rubber tubes connected together at one end, the inner tube being closed across at the other end and receiving said core or bar, and webs between the outer and inner tubes adjacent to said closed end, the outer tube being formed with a head outside the closed end of the inner tube and a valve therein to allow the grip to be inflated, and ferrules receiving within them the respective ends of the pneumatic grip, substantially as set forth.

Signed by me this 30th day of September, A. D. 1896.

A. W. KING.

Witnesses:
GEO. T. PINCKNEY,
HAROLD SERRELL.